Aug. 31, 1943.   J. B. SCHWAB   2,328,299
GRADING APPARATUS
Filed Aug. 12, 1941   5 Sheets-Sheet 2
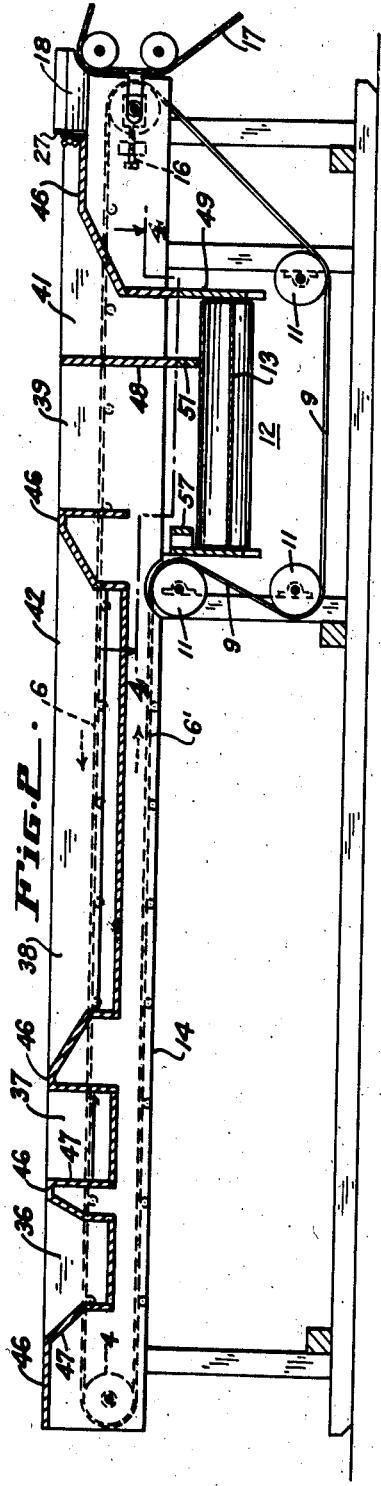
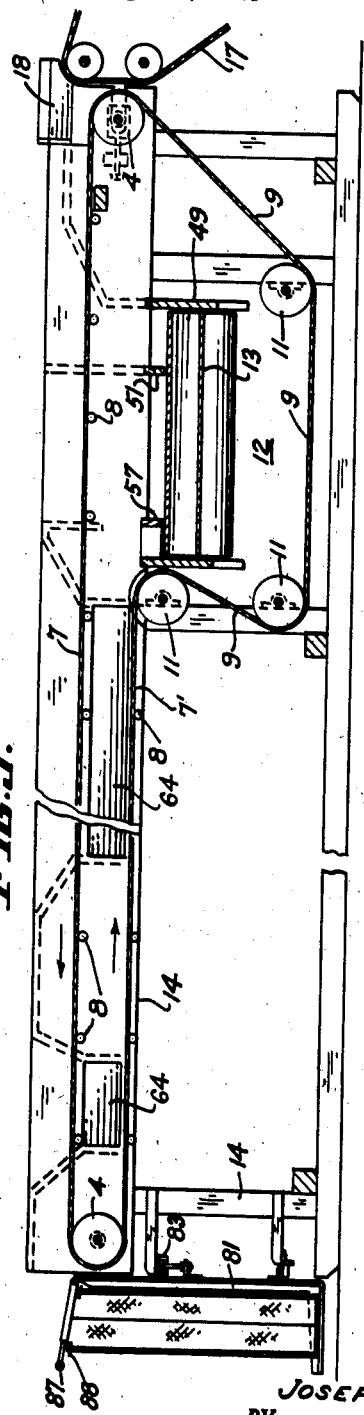
INVENTOR.
JOSEPH B. SCHWAB
BY
ATTORNEY.

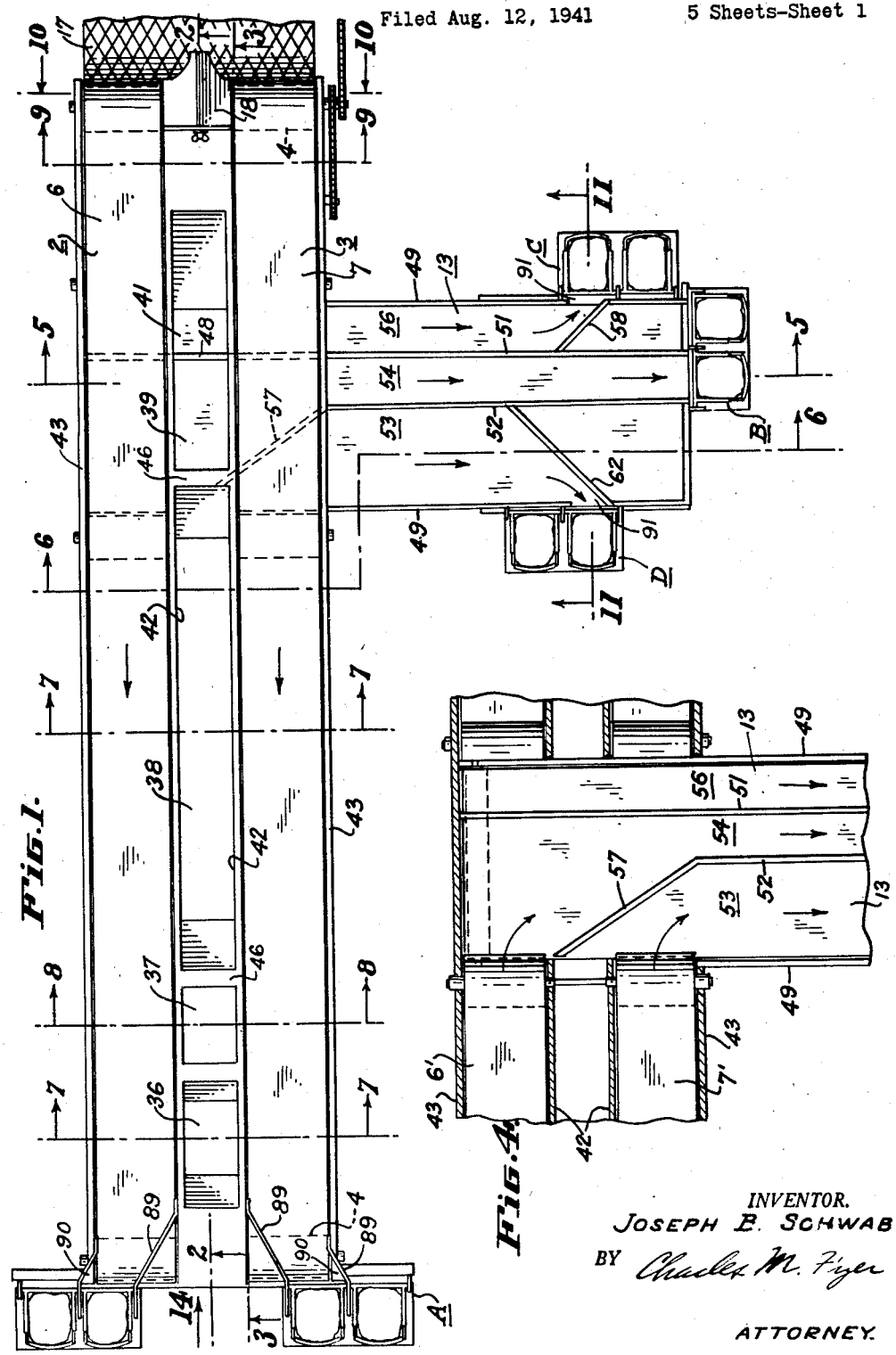

Aug. 31, 1943.   J. B. SCHWAB   2,328,299
GRADING APPARATUS
Filed Aug. 12, 1941   5 Sheets-Sheet 3
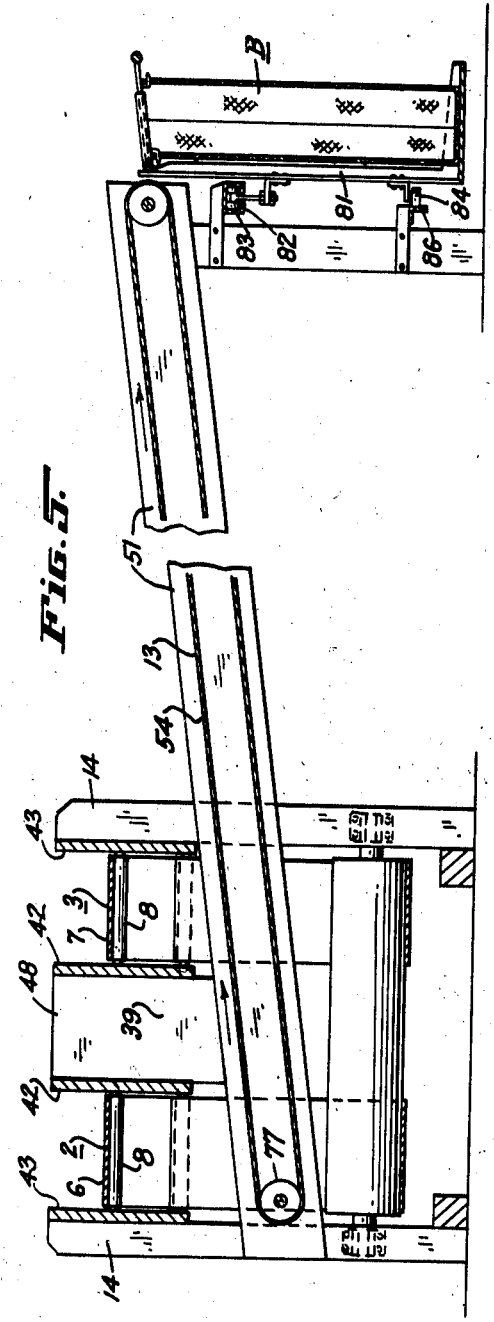
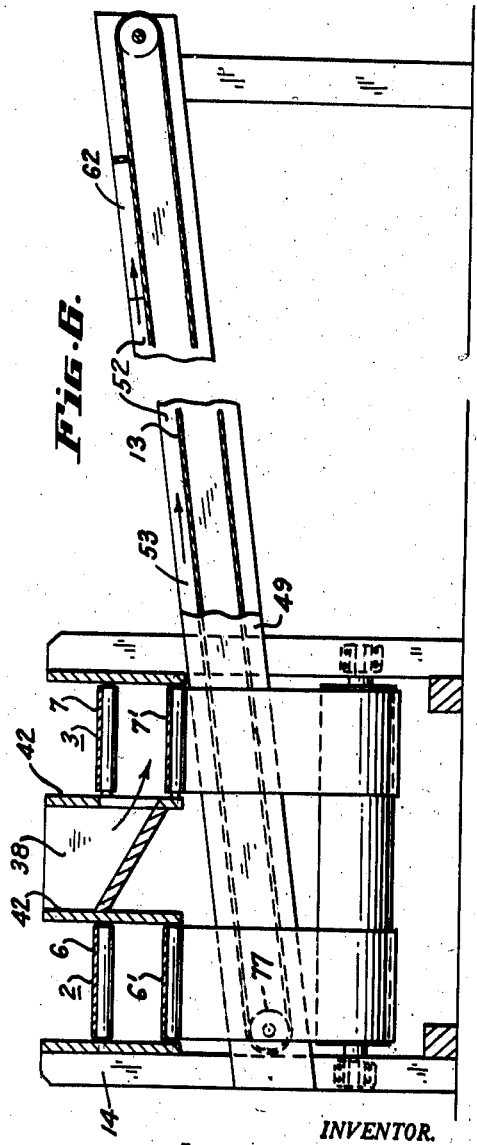
INVENTOR.
JOSEPH B. SCHWAB
BY
ATTORNEY.

Aug. 31, 1943.    J. B. SCHWAB    2,328,299
GRADING APPARATUS
Filed Aug. 12, 1941    5 Sheets-Sheet 4
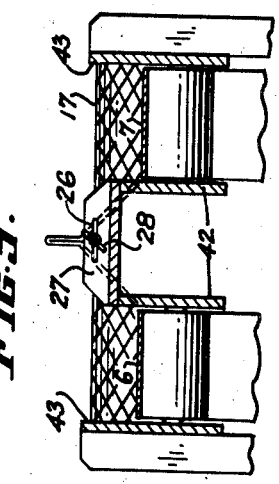
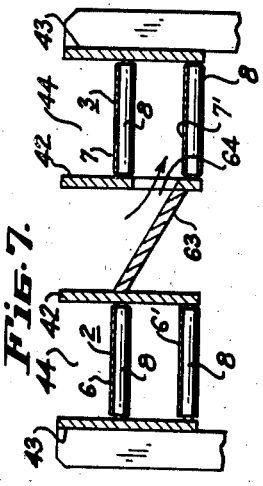
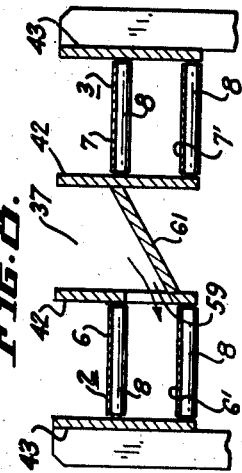
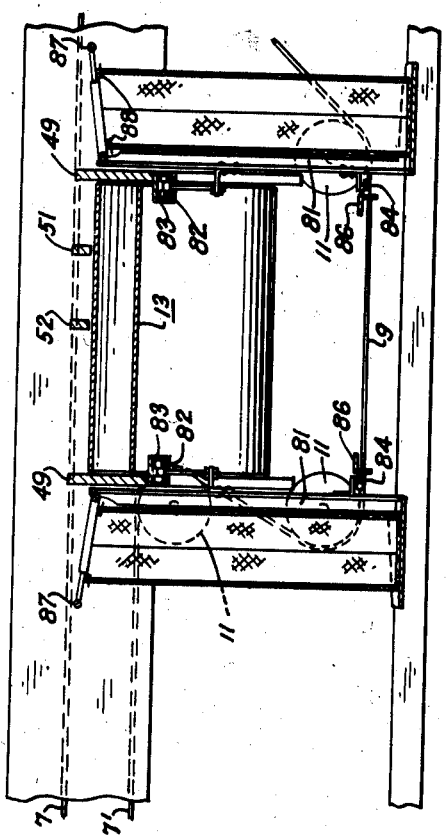
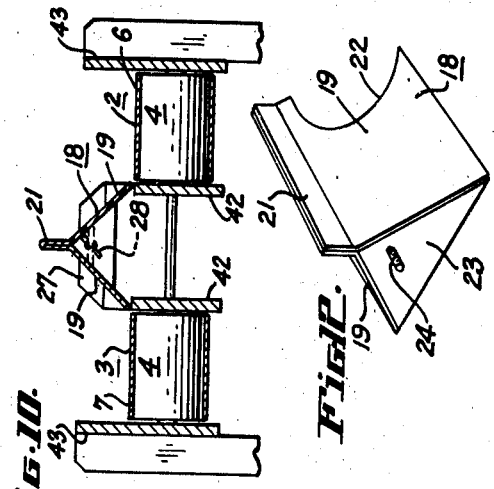
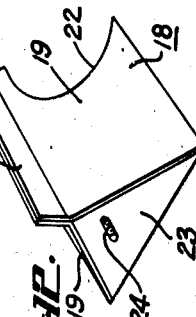
INVENTOR.
JOSEPH B. SCHWAB
BY Charles M. Finger
ATTORNEY.

Aug. 31, 1943.        J. B. SCHWAB         2,328,299
                   GRADING APPARATUS
              Filed Aug. 12, 1941        5 Sheets-Sheet 5
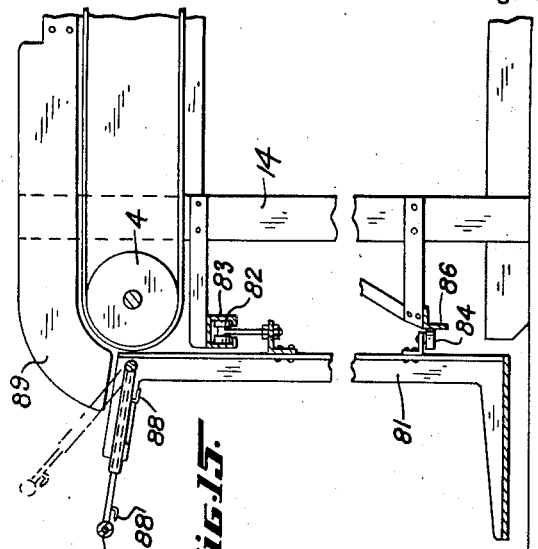
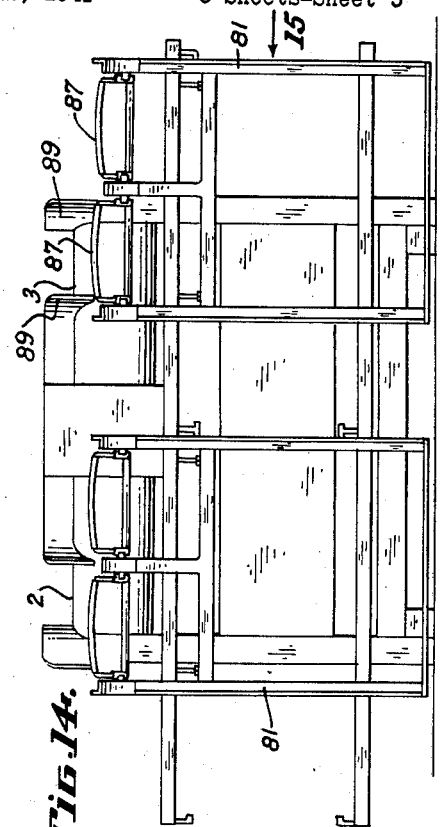
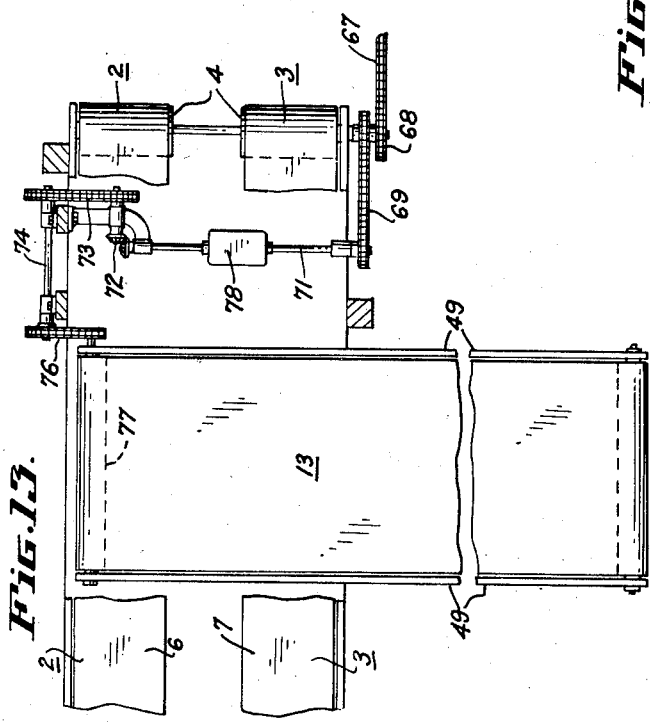
INVENTOR.
JOSEPH B. SCHWAB
BY Charles M. Pryer
        ATTORNEY.

Patented Aug. 31, 1943

2,328,299

UNITED STATES PATENT OFFICE 2,328,299

GRADING APPARATUS

Joseph B. Schwab, Stockton, Calif.

Application August 12, 1941, Serial No. 406,508

5 Claims. (Cl. 209—125)

My invention relates to grading apparatus and more particularly to graders of the endless belt type for enabling workmen to classify objects to be graded, and which is provided with means to distribute the classified objects to desired locations where they may be collected in receptacles. The apparatus of my invention has found great applicability for the grading of potatoes. However, it will be apparent, as the specification proceeds, that such apparatus may be employed for grading other objects, if so desired.

Objects of my invention are to provide an improved apparatus of the character described, which is of simple and economical construction, occupies a minimum space, has a large capacity even though occupying a minimum space, and which is of such construction as to enable workmen to classify quickly and easily the objects to be graded. Other objects of my invention will become apparent from a perusal of the following description thereof.

In general, the apparatus of my invention comprises a plurality of adjacent main endless conveyers which are positioned side by side in spaced relationship. The upper reaches of such conveyers conduct the objects to be classified in one direction; and workmen at the sides of such conveyers can readily select objects from the upper reaches and place them in suitable object receiving means in the space between the conveyers. Some of the object receiving means conduct selected objects directly to a cross conveyer; and others are associated with means for conducting selected objects to the under reaches of the main conveyers. Such under reaches, traveling in a direction opposite to the upper reaches, convey the objects to the cross conveyer, which has means enabling proper segregation of the classified objects which are conducted to predetermined locations. Objects remaining on the upper reaches of the adjacent main conveyers are collected at the discharge turns thereof.

Reference is now made to the drawings for more detailed description of the invention, in which:

Fig. 1 is a plan view of the apparatus of my invention;

Fig. 2 is a section taken in a plane indicated by 2—2 in Fig. 1;

Fig. 3 is a section taken in a plane indicated by line 3—3 in Fig. 1;

Fig. 4 is a fragmentary horizontal section taken in planes indicated by line 4—4 in Fig. 2;

Fig. 5 is a section taken in a plane indicated by line 5—5 in Fig. 1; a portion of the structure being shown broken away to shorten the view;

Fig. 6 is a section taken in planes indicated by line 6—6 in Fig. 1; portions of the structure being omitted to shorten the view;

Fig. 7 is a sectional view taken in a plane indicated by line 7—7 in Fig. 1. Such section line 7—7 appears at two locations; the view being the same at each of such locations;

Fig. 8 is a section taken in a plane indicated by line 8—8 in Fig. 1;

Fig. 9 is a section taken in a plane indicated by line 9—9 in Fig. 1;

Fig. 10 is a section taken in a plane indicated by line 10—10 in Fig. 1;

Fig. 11 is a section taken in a plane indicated by line 11—11 in Fig. 1;

Fig. 12 is a perspective view of a distributing deflector employed on the machine;

Fig. 13 is a more or less schematic plan view illustrating driving mechanism for the apparatus; portions of the structure being omitted from the view to illustrate more clearly the construction;

Fig. 14 is an end elevation of a desirable form of receptacle supporting mechanism that may be employed with the apparatus, looking in the direction of arrow 14 in Fig. 1;

Fig. 15 is a side elevation of the structure appearing in Fig. 14, looking in the direction of arrow 15 in Fig. 14; a portion of the structure being shown in section to illustrate more clearly the construction.

The preferred form of grading apparatus, which is illustrated, comprises a pair of adjacent endless belt conveyers 2 and 3 which are substantially the same length and are positioned side by side with a space therebetween. The turns of such conveyers are about rollers 4; and upper reach 6 of conveyer 2 travels in one direction, which is the same as the upper reach 7 of conveyer 3, while the lower reach 6' of conveyer 2 and the lower reach 7' of conveyer 3 travel in an opposite direction. Such directions of travel are indicated by the direction arrows in the drawings. Idler rollers 8 are provided at suitably spaced distances along the various reaches to support the same.

As can be seen more clearly from Figs. 2 and 3, the lower reaches 6' and 7' have portions 9 about intermediate guide rollers 11 which are so positioned as to provide a relatively large space 12 adapted to receive, under the upper reaches 6 and 7 and without interference to the travel of the lower reaches, a cross conveyer 13 for a purpose to be subsequently explained. In this connection the upper left hand guide roller 11, appearing in Figs. 2 and 3, provides intermediate discharge turns on lower reaches 6' and 7', adjacent conveyer 13. The entire assembly, including rollers 4, 8 and 11, is supported on a suitable frame structure 14; the right hand roller 4 appearing in Figs. 1, 2 and 3 being mounted on any suitable adjustable means 16. Any suitable slack take-up and adjusting means (not shown) for causing the endless conveyers to run evenly is preferably provided at suitable locations.

In the grading of potatoes, conveyers 2 and 3 are usually associated with any suitable washing means (not shown) and pre-grading mechanism by which the potatoes are first washed, and then the smaller sizes thereof segregated. A portion of the last pre-grading mechanism, which may comprise an endless apertured conveyer 17, in which the apertures are of a size sufficient to pass only a desired small size potato, is shown associated with endless conveyers 2 and 3, at the receiving turns thereof appearing at the right in Figs. 1, 2 and 3. Such pre-grading conveyer delivers various size potatoes onto the upper reaches 6 and 7 of conveyers 2 and 3. For example, the potatoes delivered may be relatively large size baking potatoes, a select size, a size designated in the art as "twos," and relatively poor potatoes designated as "culls."

Means is provided between pre-grading conveyer 17 and endless conveyers 2 and 3 to insure uniform distribution of the potatoes on such conveyers. Such means comprises a deflector 18 mounted for lateral adjustment in the space between endless conveyers 2 and 3 adjacent the receiving turns thereof. The deflector includes opposite side walls 19 which slope downwardly and outwardly from a central dividing baffle 21, and is formed at one end with a recess 22 of a proper curvature to accommodate the discharge turn of pre-grading conveyer 17. At its opposite end 23, deflector 18 has stud 24 which extends through elongated slot 26 formed in upwardly extending bracket member 27 secured to frame structure 14; and a wing nut 28 screwed on stud 24 serves to hold deflector 18 in laterally adjusted position. Should the flow of potatoes be unequal to the upper reaches 6 and 7 of endless conveyers 2 and 3, respectively, deflector 18 may be readily adjusted laterally between the two conveyers to the point where the flow of potatoes is so divided as to cause uniform distribution thereof on such upper reaches 6 and 7.

As the potatoes are carried in one direction by the upper reaches 6 and 7 of conveyers 2 and 3, respectively, workmen who are positioned at the side of such conveyers can readily make a further grading of the potatoes by removing from such upper reaches potatoes of desired characteristics; and to expedite the grading operation, means is provided in the space between conveyers 2 and 3 for receiving the potatoes selected by the workmen. Such means comprises a plurality of hopper-like openings 36, 37, 38, 39 and 41, which are formed between spaced walls 42 in the space between conveyers 2 and 3 and which extend above the upper reaches of such conveyers along their adjacent inner side edges; similar walls 43 extending adjacent the outer side edges of such conveyers. Thus, the pairs of walls 42 and 43 form troughs 44 in which potatoes conducted by the upper reaches of the conveyers are retained.

The top spaces adjacent openings 36, 37, 38, 39 and 41 are closed by suitable covers 46; and suitable end walls 47 between side walls 42 cooperate with such side walls to segregate completely the openings. Hence, potatoes deposited in the openings will fall downwardly therethrough by gravity. Each of the potato-receiving openings is intended to receive potatoes of predetermined characteristics selected by the workmen; and to indicate the type of potatoes which the openings are adapted to receive, suitable designations may be imprinted on the apparatus adjacent such openings. The openings may be of any predetermined size according to the proportion of the various grades of potatoes being conducted by the upper reaches of conveyers 2 and 3. Usually, the potatoes will contain a large number of a so-called "two" grade, and a smaller number of so-called "culls" and "bakers." Hence central opening 38, which is the largest opening, is adapted to receive "twos"; relatively small opening 37 at the left of opening 38 (as the openings appear in Figs. 1, 2 and 3) is adapted to receive "culls"; opening 36 at the left of opening 37 is adapted to receive "twos" which may not have been selected at the time they pass opening 38; opening 39 at the right of opening 38 is adapted to receive "culls"; and opening 41 at the right of opening 39 is adapted to receive "bakers." In this connection, it is to be observed that segregation between openings 39 and 41 is by means of vertical partition wall 48 extending between spaced walls 42. Workmen leave on the upper reaches 6 and 7 of the conveyers a select grade of potatoes which are conducted to a sacking station A at the discharge turns, where they are sacked by any suitable means, a preferred form of which is illustrated and will be subsequently described.

Means, including the lower or return reaches 6' and 7' of conveyers 2 and 3, respectively, is associated with the potato-receiving openings for conducting selected potatoes to predetermined locations on endless cross conveyer 13, where they may be also sacked. As was previously related, cross conveyer 13 is mounted in relatively large space 12; and one side thereof is adjacent the intermediate discharge turns on the under reaches 6' and 7' formed by the left upper guide roller 11 appearing in Figs. 2 and 3. The side edges of conveyer 13 are bounded by side walls 49; a partition wall 51 being located over the upper reach of the conveyer in line with vertical partition wall 48 and another partition wall 52 being also provided over the upper reach of conveyer 13 to the left of wall 51. Thus, with particular reference to Figs. 1 and 4, walls 49, 51 and 52 cooperate with conveyer 13 to provide a left trough 53, an intermediate trough 54, and a right trough 56 which are adapted to segregate the potatoes and convey them in independent paths.

Left trough 53 is adapted to receive potatoes from lower reach 7' of conveyer 3 and intermediate trough 54 is adapted to receive potatoes from the lower reach 6' of conveyer 2; a diagonally positioned partition 57 extending over conveyer 13 from an end of partition wall 52 to a position between reaches 6' and 7' to segregate the potatoes as they are delivered onto conveyer 13 by lower reaches 6' and 7'. It is to be noted that the space over conveyer 13 between diagonal partition 57 and wall 51 is in communication with opening 39; so that "culls" deposited in opening 39 will fall directly into such space and be conducted in trough 54 to a suitable sacking station B for sacking of the "culls." Opening 41 is in communication with trough 56 so that "bakers" deposited therein will be delivered into trough 56 to a suitable sacking station C; an oblique end deflector 58 being positioned over conveyer 13 in association with trough 56 to deliver the potatoes sidewise to sacking station C.

With reference to Fig. 8, it is to be noted that wall 42 adjacent the inner edge of conveyer 2 is formed wtih a side aperture 59 in communication with lower reach 6', and that hopper opening 37 is provided with an inclined bottom 61 to deliver by gravity the "culls" deposited therein through aperture 59 onto the lower reach 6' of conveyer 2. Thus, "culls" deposited in opening 37 are directed to the lower reach 6' of conveyer 2 where they are carried back by such reach 6' to the space over conveyer 13 between diagonal partition 57 and wall 51, so that such "culls" intermingle with the "culls" deposited in opening 39.

Each of openings 36 and 38 delivers "twos" to lower reach 7' of conveyer 3 which conducts such "twos" to trough 53 on conveyer 13 where they are carried to sacking station D; a suitable oblique end deflector 62 being provided over conveyer 13 in association with trough 53 to deliver the "twos" sidewise to sacking station D. The means for delivering the potatoes to lower reach 7' of conveyer 3 is similar for each of openings 36 and 38; consequently the section of Fig. 7 is taken at two locations. Such delivery means comprises an inclined bottom 63 for each of openings 36 and 38, which conducts the potatoes by gravity through an aperture 64 formed in wall 42 adjacent the inner edge of conveyer 3, onto the lower reach 7' of such conveyer 3.

From the preceding description it is seen that the upper conveyer reaches 6 and 7 traveling in one direction conduct a select grade of potatoes left thereon to sacking station A; lower conveyer reach 7', traveling in an opposite direction, delivers "twos" deposited in openings 36 and 38, into trough 53 where they are conducted to sacking station D; lower reach 6', also traveling in a direction opposite to that of the upper reaches, conducts "culls" deposited in opening 37, into intermediate trough 54 on conveyer 13, and "culls" also deposited in opening 39 are delivered into trough 54 where the "culls" are conducted to sacking station B; and "bakers" deposited in opening 41 fall into trough 56, where they are conducted to sacking station C. Thus a compact arrangement obtains by virtue of the adjacent main conveyers, the utilization of the lower reaches of such conveyers for returning the graded potatoes, and the cross conveyer 13 for conducting such potatoes to suitable sacking locations.

Any suitable means may be provided for driving conveyers 2, 3 and 13 at suitable correlated speeds. A form of such means is schematically illustrated in Fig. 13, comprising driving chain 67, connected to any suitable power source not shown and adapted to rotate sprocket 68 connected to drive roller 4 forming the receiving turns for conveyers 2 and 3. Driven from chain 67 is a downwardly extending chain drive 69 connected to drive cross shafting 71 in turn connected by bevel gearing 72 to upwardly extending chain drive 73 which is connected to shaft 74 which drives chain drive 76 connected to a driving roller 77 forming one of the turns of conveyer 13. The drive is such as to cause the upper reaches of conveyers 2 and 3 to travel to the left with reference to Figs. 1 and 13; and to cause the upper reach of conveyer 13 to travel in a proper direction toward stations B, C and D, suitable reverse gearing in box 78 is interposed in cross shafting 71, in the form of drive illustrated.

Although cross conveyer 13 is illustrated as extending beyond the left side of main conveyer 3 with reference to the direction of travel of the upper reach thereof, it is apparent that such cross conveyer including its segregating troughs, and the drive therefor, may be assembled so as to extend beyond the right side of conveyer 2, if so desired. This feature is desirable because, depending upon the ground floor arrangements that may exist in various plants, it may be more convenient to have cross conveyer 13 adapted for extension from either side of the main conveyers.

Any suitable receptacle means may be provided at stations A, B, C, and D for sacking of the graded potatoes. With reference to Figs. 14 and 15, I prefer to employ a novel form of sacking means which enables one sack or receptacle to be in position for receiving graded potatoes while another sack adjacent thereto can be prepared to receive such potatoes, so that when such sack is loaded, the other sack can be shifted to a position for loading thereof without interruption of the flow of potatoes. Such sacking means is the same at all of the stations; therefore, only the means at station A will be described.

Adjacent the discharge turn of each of the conveyers 2 or 3 is a sacking frame 81 having secured thereto rollers 82 slidably mounted in a cross-rail 83 secured to frame structure 14, so as to permit shifting of the frame relative to such conveyer. Rollers 82 support the weight of sacking frame 81; and cooperating lower rollers 84 bearing against a lower cross-rail 86, also supported on framework 14, maintain the sacker in an upright position. Frame 81 has a pair of pivotally mounted, rectangularly shaped open sack supporting brackets 87 positioned side by side, and having corner hooks 88 upon which a fabric sack may be removably attached. With one of sack supporting brackets 87 having a sack thereon, in a position to be filled, the other adjacent sack supporting bracket 87 is out of such position, and a sack may be readily attached thereto.

When a sack being loaded is completely filled, the entire frame may be rapidly shifted endwise so that the other prepared sack may be filled without interruption in the flow of potatoes. The filled sack may be readily removed and an empty sack replaced in position therefor. Thus it is seen that no time will be lost during the sacking. The pivotal mounting of the sack supporting brackets 87 is desirable because it permits manual up and down movement while a sack is being loaded, to cause the load to fill evenly such sack. Also, such mounting allows the brackets to be raised when it is desired to attach or disconnect a sack therefrom, thus facilitating such operations.

The width of endless conveyers 2 and 3 is greater than the width of each of sack supporting brackets 87; and to cause the potatoes to flow in a proper stream into the sacks and yet allow plenty of room for shifting of both of the sacking frames 81 at the discharge turns of conveyers 2 and 3, a pair of spaced deflectors 89 forming a space substantially the same width as each bracket 87, is associated with the discharge turn of each of endless conveyers 2 and 3. A cover plate 90 is provided adjacent the outer corner of each of conveyers 2 and 3 to preclude potatoes from falling through the space which would otherwise occur because the outside deflectors 89 project beyond the outer edges of the conveyers. To permit flow of potatoes into the sacking mechanism at station B, the discharge end of trough 54 is open; and for a similar purpose, side walls 49 are formed with apertures 91 of suitable size, providing for proper flow of potatoes into the sacking mechanism at stations C and D.

Although I have described my improved grading apparatus in connection with the grading of potatoes, where I have found it has great applicability, it is apparent that it may be employed for the grading of any objects having different predetermined characteristics, where it is desired to segregate such objects.

I claim:

1. Grading apparatus comprising adjacent endless conveyers positioned side by side with a space therebetween and having upper and lower reaches, means in such space for receiving objects selected from the upper reaches of said conveyers, some of said receiving means being adapted to receive objects of predetermined characteristics and other of said receiving means being adapted to receive objects of other predetermined characteristics, means associated with said some receiving means for conducting said objects of predetermined characteristics to the lower reach of one of said conveyers, means associated with said other of said receiving means for conducting said objects of other predetermined characteristics to the lower reach of another of said adjacent conveyers, each of said lower reaches having an intermediate discharge turn from which selected objects are discharged, a cross conveyer below said upper reaches and positioned adjacent said intermediate discharge turns for receiving said selected objects from said lower reaches, and additional means in such space over said cross conveyer for receiving objects of predetermined characteristics and directing them to said cross conveyer.

2. Grading apparatus comprising adjacent endless conveyers positioned side by side with a space therebetween and having upper and lower reaches, means in such space for receiving objects selected from the upper reaches of said conveyers, some of said receiving means being adapted to receive objects of predetermined characteristics and other of said receiving means being adapted to receive objects of other predetermined characteristics, means associated with said some receiving means for conducting said objects of predetermined characteristics to the lower reach of one of said conveyers, means associated with said other of said receiving means for conducting said objects of other predetermined characteristics to the lower reach of another of said adjacent conveyers, each of said lower reaches having an intermediate discharge turn from which selected objects are discharged, a cross conveyer below said upper reaches and positioned adjacent said intermediate discharge turns for receiving said selected objects from said lower reaches, additional means in such space over said cross conveyer for receiving objects of predetermined characteristics and directing them to said cross conveyer, and means cooperating with said cross conveyer for maintaining segregation of said selected objects as they are conducted by said cross conveyer.

3. Grading apparatus comprising adjacent endless conveyers positioned side by side with a space therebetween and having upper and lower reaches, means in such space for receiving objects selected from the upper reaches of said conveyers, some of said receiving means being adapted to receive objects of predetermined characteristics and other of said receiving means being adapted to receive objects of other predetermined characteristics, means associated with said some receiving means for conducting said objects of predetermined characteristics to the lower reach of one of said conveyers, means associated with said other of said receiving means for conducting said objects of other predetermined characteristics to the lower reach of another of said adjacent conveyers, each of said lower reaches having an intermediate discharge turn from which selected objects are discharged, a cross conveyer below said upper reaches and positioned adjacent said intermediate discharge turns for receiving said selected objects from said lower reaches, additional means in such space over said cross conveyer for receiving objects of predetermined characteristics and directing them to said cross conveyer, means cooperating with said cross conveyer for maintaining segregation of said selected objects as they are conducted by said cross conveyer, said cross conveyer conducting said segregated objects to predetermined locations, and receptacles at said locations for said segregated objects.

4. Grading apparatus comprising adjacent endless conveyers positioned side by side with a space therebetween and having upper and lower reaches, means in such space for receiving objects selected from the upper reaches of the conveyers, means associated with said receiving means for conducting selected objects to the lower reaches of the conveyers, each of said lower reaches having an intermediate discharge turn from which selected objects are discharged, an endless cross conveyer independent of the discharge turns and located below the upper reaches adjacent the discharge turns for receiving selected objects from the lower reaches, and means cooperating with the cross conveyer for maintaining segregation of objects discharged from the discharge turns onto the cross conveyer.

5. Grading apparatus comprising adjacent endless conveyers positioned side by side with a space therebetween and having upper and lower reaches, means in such space for receiving objects selected from the upper reach of one conveyer and conducting them to the lower reach of the adjacent conveyer, additional means in such space for receiving objects selected from the upper reach of the latter conveyer and conducting them to the lower reach of the conveyer adjacent thereto, each of said lower reaches having an intermediate discharge turn from which selected objects are discharged, an endless cross conveyer independent of the discharge turns and located below the upper reaches adjacent the discharge turns for receiving selected objects from the lower reaches, and means cooperating with the cross conveyer for maintaining segregation of objects discharged from the discharge turns onto the cross conveyer.

JOSEPH B. SCHWAB.